United States Patent Office 2,966,416
Patented Dec. 27, 1960

2,966,416
METHOD OF MANUFACTURING A DIETETIC CURED FOOD PRODUCT AND COMPOSITION THEREFOR

Michael W. Kossoy, Chicago, and Marvin M. Voegeli, Downers Grove, Ill., assignors to Swift & Company, Chicago, Ill., a corporation of Illinois No Drawing. Filed Mar. 4, 1958, Ser. No. 718,993

4 Claims. (Cl. 99—222)

The present invention relates in general to the production of a dietetic food product. More particularly, the invention contemplates production of a composition which when used to cure product containing a heme pigment is free of added sodium.

Conventionally in the curing of meat it is customary to either employ a dry cure wherein curing salts are sprinkled over and around the meat to be cured, a wet cure wherein the curing salts are dissolved in water and the meat immersed in the brine, or pickle, so formed, or a quick cure wherein the pickle is injected into the veins or muscle tissue of the meat. The conventional ingredients used in curing are sodium nitrate, sodium nitrite, sodium chloride and sugar. The nitrates and nitrites are the source of the nitric oxide which combines with the heme pigments of the meat to form the nitric oxide heme pigments. It is the presence of such pigments which indicates a "cured" product. The sodium chloride gives the product the salty flavor typical of cured meat.

Because of the incorporation of both sodium salts and sugars in cured meat products, these products have been unsuitable for use by persons who for one reason or another (for example those with heart disease, diabetes, or persons on reducing diets) must eat sodium salt-free and/or sugar-free foods. Through the use of the present invention it is possible for such persons to enjoy a variety of cured meat products which have substantially the same flavor as conventionally cured meats but do not contain the ingredients which have heretofore made the foods unsuitable for them.

One of the objects of our invention is to provide a composition free of added sodium and sugar which when used in the curing of meats imparts substantially the conventional cured flavor to the meat.

A further object of the invention is to produce a palatable dietetic food product.

Another object of the invention is to provide a method for producing a dietetic-diabetic food product.

These and further objects will readily become apparent to those familiar with the food processing industry upon reading the following detailed description.

Broadly speaking we contemplate preparation of a curing pickle wherein the nitric oxide producing materials are free from the sodium ion and wherein the flavor producing materials are soluble in the pickle solution and free from the sodium ion.

Where natural sugar is used solely for sweetening purposes (rather than as a fermentable substance or bodying agent) it has been found feasible in some instances to replace such sugar with an "artificial" chemical sweetener. Sweetening agents which have been widely used are sodium cyclamate and calcium cyclamate, commonly sold under the trademark "Sucaryl" sodium and "Sucaryl" calcium, as well as the better known saccharin. Other examples of artificial sweetening agents are p-ethoxyphenylurea (also known as dulcin) and 2-amino-4-nitro-1-n-propoxybenzene.

In carrying out the process of our invention, the conventional sodium salt brines must be eliminated. The necessity for a sodium-free pickle poses a problem in formulating a curing pickle which will not salt out or precipitate the added chemical sweetener. For example, the cyclamate salts are not soluble in our sodium-free brine and the sodium cyclamate is undesirable even when used in the small amounts needed because of its sodium content. Another factor involved in the selection of a sweetener is its tolerability by the persons who are limited to sodium salt-free and/or sugar-free foods. We have found that saccharin is a particularly good artificial chemical sweetener for our purposes. It is readily soluble in the brine; and, inasmuch as it is several times sweeter than natural sugar, very small amounts are required to achieve the desired flavor, a factor which is of economic importance.

We have found that sodium-free cured meat food products can be formulated by using special pickles containing no sodium ion, and natural sugars or artificial chemical sweeteners characterized by their ready solubility in the synthetic brine and freedom from sodium ion. In the preparation of the curing brines for these food products, we preferably use a small but perceptible amount of potassium nitrate and potassium nitrite. Either salt may be used singly but we prefer to use mixtures of the two. To attain a cured salty flavor we use a small amount of ammonium chloride and potassium chloride; and, to achieve the desired sweet flavor, a small but significant amount of any one of the artificial chemical sweeteners which is readily soluble in the brine and which is free from sodium can be employed. In our preferred composition we use saccharin as the sweetener. Of course, if a sugar-free product is not required, natural sugars can be used rather than the artificial sweetener.

While it is feasible to pepare the pickle solution by replacing the sodium chloride with ammonium chloride or potassium chloride alone, we have found that with respect to giving the best flavor possible, a mixture of the two salts is preferable. Thus, while ammonium chloride alone produces a product having a somewhat bitter taste, and potassium chloride alone produces a product having a metallic taste, we have found that with the proper combination of these two salts in the pickling brine a solution results with which a very palatable product can be prepared. In this regard we have found that the mixture should contain at least about 30% potassium chloride, with the preferred ratio of potassium chloride to ammonium chloride being about 80/20. By using such a combination, the taste pattern of either salt alone is offset by the combined flavor of the two.

The following examples are illustrative of the use of our inventive concept in the preparation of a cured meat food product:

*Example I*

Three curing pickles were prepared incorporating the following ingredients in water:

| | Percent |
|---|---|
| (1) Potassium nitrite | .135 |
| Potassium nitrate | .075 |
| Saccharin | 1.15 |
| Potassium chloride and ammonium chloride | *13.98 |
| (2) Potassium nitrite | .135 |
| Potassium nitrate | .075 |
| Sodium cyclamate | 1.15 |
| Potassium chloride and ammonium chloride | *13.98 |
| (3) Potassium nitrite | .135 |
| Potassium nitrate | .075 |
| Sucrose | 2.3 |
| Potassium chloride and ammonium chloride | *12.99 |

*80% potassium chloride, 20% ammonium chloride.

Three green bacon bellies were pumped, one with each of the above pickles, on the basis of 10% by weight, and subsequently processed according to normal bacon schedules. The bacon processed with pickles Nos. 1 and 2 was quite sweet but had no metallic or bitter taste. Bacon processed with pickle No. 3 had a good smoked flavor. It was noted that when the brine was formed with the ingredients of pickle No. 2, a white flocculent precipitate was formed and remained even when the solution was heated above 100° F. With regard to insolubility in the pickle solution, we have also found that commercially available sodium-salt substitutes which contain calcium and other salts insoluble in the pickle are not suitable for use in preparing a brine, although these might be used to advantage when making a dry salt mix.

Sodium analyses of processed and fried bacon from the above are as follows:

Pickle No. 1: Na+ p.p.m.
  Processed _____ 350
  Fried _____ 750
Pickle No. 2:
  Processed _____ 420
  Fried _____ 970
Pickle No. 3:
  Processed _____ 340

*Example II*

A test was conducted to find a particularly suitable formulation for a sodium-free bacon curing pickle which, when incorporated into the bacon, would impart a flavor simulating the conventionally cured product. Three samples of bacon product were pumped with 10% by weight of a pickle solution including the following ingredients:

Percent
(1) Potassium nitrite _____ .135
    Potassium nitrate _____ .075
    Sucrose _____ 4.6
    Saccharin _____ 0.0
    Potassium chloride and ammonium chloride ___ *7.0
(2) Potassium nitrite _____ .135
    Potassium nitrate _____ .075
    Sucrose _____ 2.3
    Saccharin _____ 0.046
    Potassium chloride and ammonium chloride ___ *7.0
(3) Potassium nitrite _____ .135
    Potassium nitrate _____ .075
    Sucrose _____ 0.0
    Saccharin _____ 0.092
    Potassium chloride and ammonium chloride ___ *7.0

*80% potassium chloride, 20% ammonium chloride.

A taste panel tested the product for flavor and found that there was essentially no difference in taste between the products prepared from the three different solutions.

It will be noted that in Examples I and II, the sodium chloride replacement was made up of a mixture of 80% potassium chloride and 20% ammonium chloride. Ranges from 80% potassium chloride and 20% ammonium chloride to 30% potassium chloride and 70% ammonium chloride have been tested, with the 80/20 ratio illustrated by the examples being especially suitable. We have also made organoleptic tests on a bacon product in which the percentage of the potassium chloride/ammonium chloride mixture and the percentage of sugar have been varied. In this regard, 2.3% appears to be preferable for sucrose and about .046% appears to be preferable for saccharin, as does about 7% for the potassium chloride/ammonium chloride mixture.

*Example III*

The following pickling solutions were prepared and then pumped into picnics (pork shoulder butts) on the basis of 15% pickle, by weight, and the picnics processed in the conventional manner.

Percent
(1) Potassium nitrite _____ .135
    Potassium nitrate _____ .075
    Sucrose _____ 6.9
    Potassium chloride and ammonium chloride ___ 6.36
(2) Potassium nitrite _____ .135
    Potassium nitrate _____ .075
    Sucrose _____ 6.9
    Potassium chloride and ammonium chloride ___ 6.86
(3) Potassium nitrite _____ .135
    Potassium nitrate _____ .075
    Sucrose _____ 6.9
    Potassium chloride and ammonium chloride ___ 7.36
(4) Potassium nitrite _____ .135
    Potassium nitrate _____ .075
    Sucrose _____ 6.9
    Potassium chloride and ammonium chloride ___ 7.86

Four other pickles were prepared having the same percentages of ingredients except that in each case the sucrose was replaced by 0.5% saccharin. An evaluation of the results by a taste panel is as follows:

With respect to salty flavor:
  6.36% considered too mild in flavor
  6.86% considered fair
  7.36% considered slightly strong
  7.86% considered too strong
With respect to sweetness:
  6.9% sugar considered satisfactory
  0.5% saccharin considered too sweet
Other analyses:
  The color of the products was typical of cured meats. No caramelization was noted in the saccharin treated samples, indicating that there is no charring of the product such as may occur in a sugar-cured product.

In order to find the optimum concentrations of salt and sweetener to be used in the curing of picnics, the potassium chloride/ammonium chloride mixture was varied between the 6.86% and 7.36% level, and the saccharin content was lowered to 0.345%. The product was found to be much improved over the previous samples containing saccharin. Anywhere between the range 6.86%–7.36% salt is considered suitable for picnics, with perhaps 7.0% being optimum. The product prepared was then compared with a standard sugar-cured product. It was found that the product had a bland flavor as compared to the sugar-cured product, but it is thought that a panel of people on a salt-free diet would consider it quite suitable.

From the foregoing examples it will be noted that the concentrations of the various ingredients used in formulating the pickle will vary widely with respect to a number of variables, including the type of product being treated, the degree of sweetness or saltiness desired, etc. For this reason it will be apparent that the amounts of the ingredients which we have set out are not critical but are determined primarily by flavor considerations. For example, at some future date a very sweet flavored cured product might become popular with the consumer and the production of such a sweet product is deemed to be within the scope of the invention. It will be noted that a very small amount of the nitrate and nitrite salts need be added in order to provide the product with the nitric oxide heme pigment characteristic of cured meat. We have incorporated .135% potassium nitrite and .075% potassium nitrate in our pickle solution. These are not critical amounts but are the optimum amounts from the standpoint of producing sufficient nitric oxide to combine with the heme pigment in the meat to produce good color development. Lesser amounts can be used with diminishing effectiveness as to cure. Amounts much in excess of the preferred amount, while effective to cure the product, are not economical and may not conform to governmental standards regarding the amount of nitrate and nitrite which may be contained in the product. In this regard, the maximum nitrite content allowed by the Meat Inspection Division of the Department of Agriculture is 200 p.p.m.

The word "meat" as used herein is intended to include products which contain a heme pigment. It will also be apparent that the curing composition of this invention can be used with any of the conventional methods of curing meat.

Obviously, many modifications and variations of the invention as hereinbefore set forth may be made without departing from the spirit and scope thereof, and therefore only such limitations should be imposed as are indicated by the appended claims.

We claim:

1. A composition for curing a food product containing a heme pigment which comprises in combination a minor amount of nitric oxide producing materials free from sodium and selected from the group consisting of potassium nitrate and potassium nitrite and mixtures thereof, a major amount of edible chlorides consisting essentially of a mixture of potassium and ammonium chlorides, and a minor amount of a sweetening agent free from sodium and soluble in a water solution of said nitric oxide producing materials and said chlorides.

2. The composition of claim 1 wherein the food product containing a heme pigment is pork.

3. A composition for curing a food product containing a heme pigment which comprises in combination a minor amount of nitric oxide producing materials free from sodium and selected from the group consisting of potassium nitrate and potassium nitrite and mixtures thereof, a major amount of edible chlorides consisting essentially of a mixture of potassium and ammonium chlorides, at least 30 percent of said mixture being potassium chloride and a minor amount of a sweetening agent free from sodium and soluble in a water solution of said nitric oxide producing materials and said chlorides.

4. The method of manufacturing a dietetic cured food product containing a heme pigment which comprises subjecting uncured product to the action of a curing composition comprising a minor amount of nitric oxide producing materials free from sodium and selected from the group consisting of potassium nitrate and potassium nitrite and mixtures thereof, a major amount of edible chlorides consisting essentially of a mixture of potassium and ammonium chlorides and a minor amount of a sweetening agent free from sodium and soluble in a water solution of said nitric oxide producing materials and said chlorides whereby said cured product will have the flavor associated with conventionally sodium salt cured product.

References Cited in the file of this patent

UNITED STATES PATENTS

| | | |
|---|---|---|
| 22,186 | Marsh | Nov. 30, 1858 |
| 2,601,112 | Freedman | June 17, 1952 |
| 2,688,555 | Komarik et al. | Sept. 7, 1954 |
| 2,761,783 | Ferguson | Sept. 4, 1956 |
| 2,806,793 | Kemps | Sept. 17, 1957 |
| 2,823,132 | Sair | Feb. 11, 1958 |
| 2,829,056 | Kemmerer | Apr. 1, 1958 |